Jan. 31, 1961  J. P. TERRETT ET AL  2,970,057
PROCESS FOR PRODUCING CRYSTALLINE SPRAY DRIED MATERIAL
Filed July 6, 1956  2 Sheets-Sheet 1
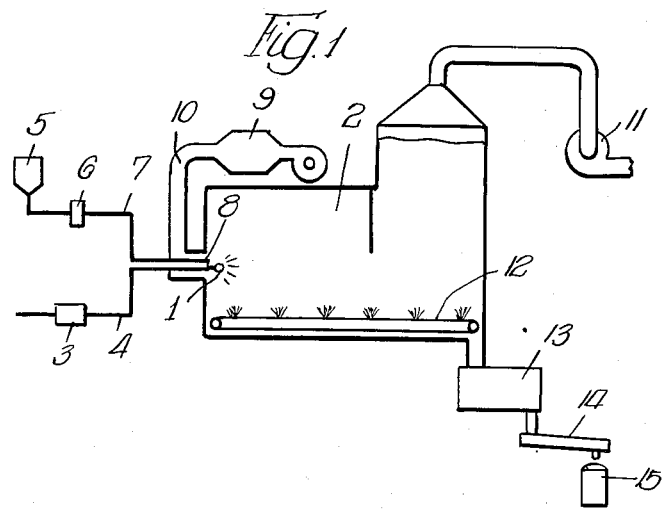
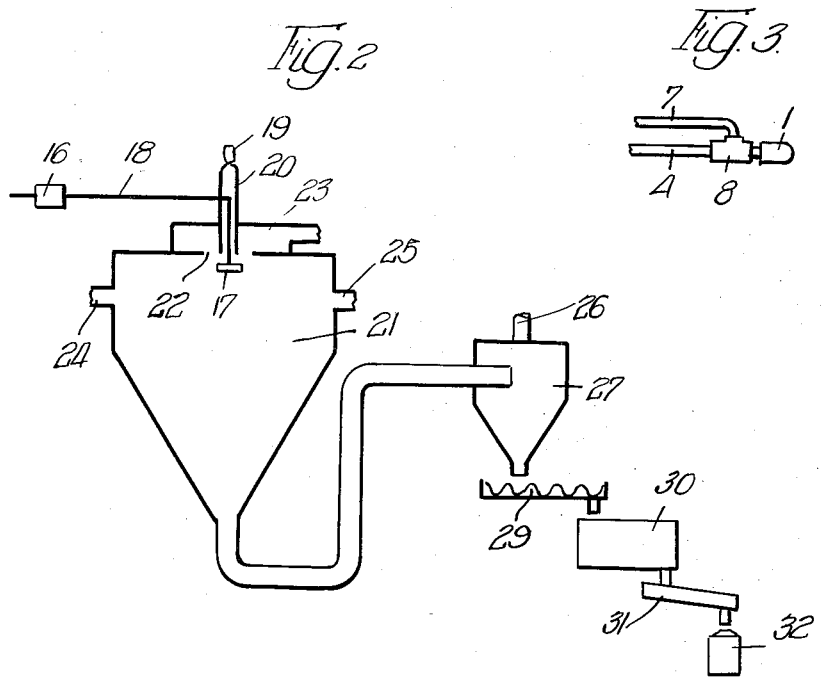
Inventors
John P. Terrett,
John B. Shields,
Louis J. Nava.
By Wilkinson, Huxley, Byron & Hume
Attys Jan. 31, 1961 J. P. TERRETT ET AL 2,970,057
PROCESS FOR PRODUCING CRYSTALLINE SPRAY DRIED MATERIAL
Filed July 6, 1956 2 Sheets-Sheet 2
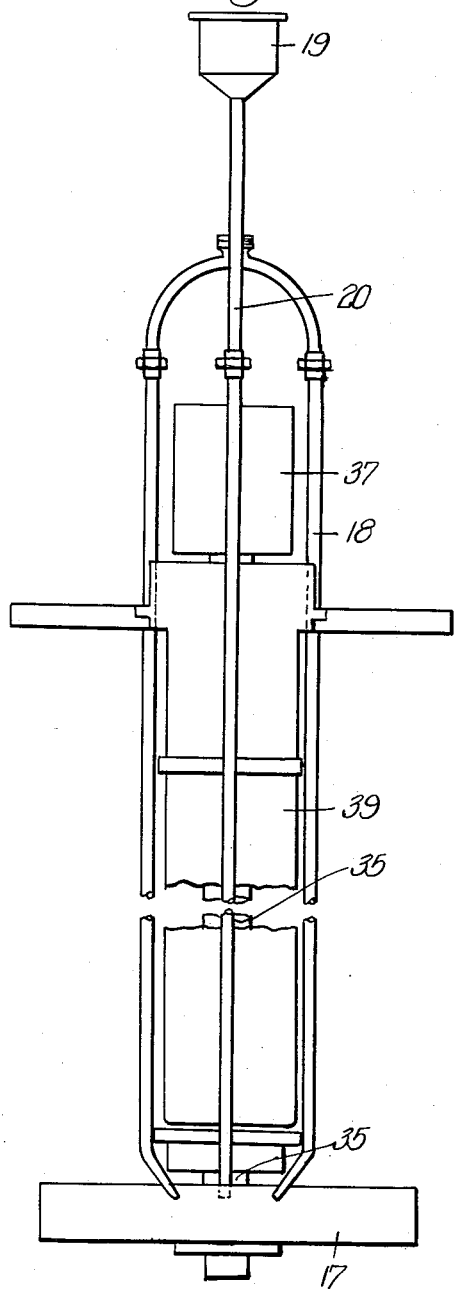
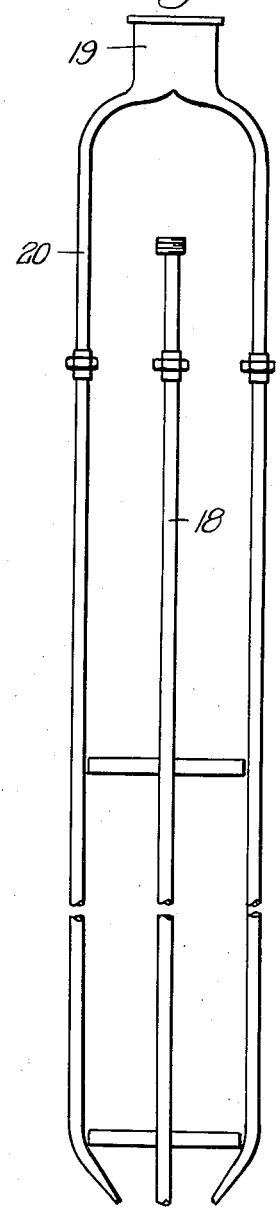
Inventors.
John P. Terrett,
John B. Shields,
Louis J. Nava,
By Wilkinson, Huxley, Byron Hume
Attys

United States Patent Office 2,970,057
Patented Jan. 31, 1961

2,970,057
PROCESS FOR PRODUCING CRYSTALLINE SPRAY DRIED MATERIAL

John P. Terrett, San Francisco, John B. Shields, Sunnyvale, and Louis J. Nava, Redwood City, Calif., assignors, by mesne assignments, to Dairy Foods Incorporated, Los Angeles, Calif., a corporation of California Filed July 6, 1956, Ser. No. 596,232

17 Claims. (Cl. 99—203)

This invention relates to a new and improved process for producing crystalline spray dried materials and more particularly to a method for supplying controllable amounts of seed crystals to concentrated fluid materials containing crystallizable substances which are to be converted substantially to a crystalline form in the spray dried material. The seeding method herein disclosed applies to the spray drying of concentrated fluid materials containing at least one crystallizable substance which is to be rendered crystalline to a substantial degree during the drying operation. It is contemplated that the drying operation comprise one or more steps but that the initial step of the drying operation be accomplished by spray drying.

An important feature of the present invention lies in the fact that the seeding step of the process herein referred to may be carried out either before or after the concentrated fluid material to be seeded has been concentrated to a degree sufficient to render said material saturated with respect to the substance or substances to be crystallized. The advantages of this feature will be apparent when it is considered that the usual method of rendering crystalline crystallizable substances contained within a dehydrated material involves concentration of the fluid material prior to drying to a high solids content at least sufficient to cause the crystallizable substance to exist in a supersaturated solution before the concentrated fluid material is seeded with an appropriate quantity of the crystalline form of the substance to be crystallized after which the concentrate is commonly held under conditions of agitation and temperature for a period of time such that the desired number of crystalline seed points have been developed prior to spray drying. This procedure is disadvantageous from the standpoint of time involved in obtaining the desired crystal development and suffers further disadvantages in that many materials bearing crystallizable components become highly viscous and difficult to handle when concentrated and held under temperature conditions productive of a saturated or supersaturated solution with respect to the substance to be crystallized. This latter difficulty is readily apparent in materials containing substantial amounts of hydrophilic substances such as the proteins of milk and milk products.

As stated above, we have discovered that these disadvantages may be readily overcome by conducting the seeding operation substantially simultaneously with the atomization step of spray drying. In practicing this invention, the concentrated material may be handled and processed under conditions of concentration and temperature well outside the crystallization zone of the substance to be crystallized during the drying operation, thereby avoiding unnecessary losses of process time as well as special product handling equipment. A further advantage of the new process is that it is well suited to continuous plant operation.

It is an object of the present invention to provide a new and improved process for producing crystalline spray dried materials.

It is also an object of the present invention to provide a new and improved method of introducing crystallization inducing seed points in concentrated fluid materials to be subjected to spray drying.

It is a further object to provide a seeding process which avoids the necessity of developing a saturated or supersaturated solution of the substance to be crystallized prior to spray drying.

It is an additional object to provide a method whereby seed points may be introduced into the concentrated material to be spray dried substantially at the time of atomization.

It is another object to provide a method whereby seed points may be introduced into the concentrated material to be spray dried just prior to atomization.

It is still another object to provide a process whereby materials bearing crystallizable substances may be seeded and spray dried to an essentially dry form containing controlled amounts of said crystallizable substances in crystalline form.

Although it will be apparent that the teachings of this invention may be advantageously applied to the dehydration of a wide variety of materials bearing crystallizable substances, we have found the principles herein disclosed especially advantageous in the controlled crystallization of milk sugar in spray dried milk and milk products. The merits of dried milk products containing substantial quantities of their lactose content in the form of alpha-lactose hydrate crystals have been described by Sharp in U.S. Patent No. 2,728,678, dated December 27, 1955, and in the application of Sharp and Kempf, Serial No. 544,862, filed December 22, 1955.

We have shown apparatus suitable for carrying out our improved methods in the accompanying drawings, in which—

Figure 1 is a diagrammatic representation of a spray drying system utilizing one or more pressure spray atomizers which serve to introduce the concentrated material to be dried into a drying chamber;

Figure 2 is a diagrammatic showing of a second common type of spray drying apparatus in which the concentrated material to be spray dried may be atomized into a drying chamber by means of a centrifugal atomizer;

Figure 3 is a showing of the spray nozzle area shown in Figure 1 on an enlarged scale;

Figure 4 is a showing, on an enlarged scale, of the apparatus used to feed seed material directly into the rotary atomizer of Figure 2; and Figure 5 is a view, with certain parts omitted, of the construction of Figure 4 as seen from the right.

Referring to Figure 1, in one method of carrying out our improved process, a suitable concentrated material such as milk concentrate is fed through feed line 4 into the pressure spray nozzle 1 by means of high pressure feed pump 3. Simultaneously, a seed slurry is pumped by means of a high pressure pump 6 from the slurry surge tank 5 through the slurry feed line 7 and mixing T 8, shown in Figure 3, into the milk concentrate as it enters the atomizing nozzle 1. Drying is accomplished by means of drying air fed into the drying chamber 2 through heater 9 and duct 10, and removed from the desiccator through fan 11. The powdered product is removed from the drying chamber 2 by the drag mechanism 12 which discharges into the secondary drier and cooler 13 after which the product is usually passed through a screening device 14 which discharges the product into the container 15.

A typical apparatus in which a rotary atomizer is employed for carrying out our process is shown in Figure 2 in which concentrated product to be dried is pumped to the rotary atomizer 17 through the product feed line 18 by means of the feed pump 16. In this instance the seed material in either a slurry or powdered form is fed from the feed tank 19 through feeders 20 into the rotary atomizer 17 so that the concentrated product to be spray dried is combined with the crystallization inducing seed material substantially simultaneously with atomization. Drying air, provided in a manner similar to that shown in Figure 1, is introduced into the conical drying chamber 21 through the orifice 22 of the drier which is supplied by ductwork 23 and through tangential inlets shown at 24 and 25. The drying air is separated from the product by cyclone 27 and discharged therefrom through duct 26. The powdered product produced by this process passes from the drying chamber 21 through duct 28 and is discharged from collecting cyclone 27 into a screw mechanism 29 which in turn delivers the product into a secondary drier and cooler 30 before being screened at 31 and barreled at 32.

In Figures 4 and 5, the rotary atomizer 17 is shown as driven by shaft 35 rotated by power supplied to pulley 37. The housing 39 encloses any well known type of water distribution system which serves to cool the bearings during operation. The details of the atomizer itself form no part of the present invention. The concentrate as a powder or as a slurry will be fed to the atomizer 17 through pipes 20 and the concentrate is fed through pipes 18. In the specific construction shown, each is fed through two pipes spaced 180° with the feeds alternated and spaced 90°.

The particular manner in which either of the above described drying systems is operated will depend to a considerable degree upon the rate of crystallization desired in the process and will depend further upon the physical characteristics desired of the powered product. Usually, however, it is necessary to depart somewhat from conventional spray drying conditions in order that a significant degree of crystallization be brought about during the drying operation. In the case of milk products, appropriate drying conditions for the crystallization of substantial quantities of alpha-lactose hydrate have been described by Sharp in U.S. Patent No. 2,728,678, and by Sharp and Kempf in their application, Serial No. 544,862.

Essentially, the development of substantial quantities of alpha-lactose hydrate crystals in powdered milk products commonly involves the seeding of the concentrated milk product which has been concentrated to such a degree as to render it supersaturated with respect to alpha-lactose hydrate after which the concentrate is held for a sufficient period of time to permit the development of relatively large quantity of crystals. This step is carried out before the spray drying operation which is preferably at somewhat lower than conventional desiccator temperatures so as to produce, as a result of spray drying, a powdered product having a moisture content of from approximately 8 to approximately 20 percent. Typically, the drying air fed to the drier may have a temperature of the order of from approximately 240° to approximately 350° F. and an air outlet temperature ranging from about 115° to about 160° F. depending upon a host of factors, chief among which are the degree of seeding and the physical characteristics desired of the finished product. Finish drying in a secondary drying system such as that shown in Figures 1 and 2, to a moisture content usually in the order of from 2 to 5 percent serves to complete the process.

Although such processes as have been described for the crystallization of lactose in dried milk products operate effectively as to purpose, the degree of seeding is frequently critical and difficult to control by methods previously employed. We have found that the introduction of lactose seed crystals into the concentrate substantially simultaneously with spray drying to be an extremely efficient means of imparting the necessary seed points to the product during spray drying. In most instances we have observed that less than 1 percent of seed material based upon the weight of the concentrate is effective in promoting the required amount of crystallization. However, when expressed on a weight basis, it is important to recognize that the quantity of seed material employed will depend to a considerable degree upon the size of the individual crystals added. In actual practice we prefer to use from approximately 0.1 to 1 percent of lactose crystals having a Tyler screen mesh size such as to pass through a 325 mesh screen. It will be apparent that the use of a coarser seed material will require higher seed levels to obtain equivalent performance to more finely divided seed material.

As has been stated above, one of the important advantages of the present invention lies in the fact that our seeding method is conveniently operable whether the substance to be crystallized exists in a condition of undersaturation, saturation, or supersaturation at the time of seeding. In other words, we have discovered that the operability of the present invention is not dependent upon a condition of saturation or supersaturation with respect to the substance to be crystallized provided the residence time of the seed within the fluid into which it is introduced is sufficiently short to avoid destruction of the crystallization inducing properties of the seed before a condition of saturation is reached as a result of subsequent dehydration. Apparently these conditions are satisfied to a high degree in spray drying due to the extremely rapid drying which the atomized product undergoes immediately upon being discharged from the atomizer.

The exact reason for the high degree of seeding efficiency experienced in using the process of the present invention remains unknown to us. Theoretically, when a substantial degree of crystallization is sought, it is desirable to impart at least one seed crystal to each droplet formed of the material being atomized in the process of spray drying. Notwithstanding this fact we have consistently observed that efficient seeding can be obtained by our seeding methods when the number of seed points supplied to the atomizer is substantially less than the theoretical requirement of one seed nucleus per spray droplet formed. By way of illustration, we have noted repeatedly that seed concentrations to the atomizer productive of only one seed crystal for approximately every ten or more spray droplets is effective in inducing substantially complete crystallization of the lactose content of milk powders produced in accordance with the methods referred to above.

Although an entirely satisfactory explanation for the observed degree of seeding efficiency is not readily apparent, it is conceivable that the effectiveness is due in substantial part to the high degree of agitation and mixing to which the mixture is subjected at the time of atomization which may occasion an extraordinarily high incidence of contact of a limited number of seed crystals with a relatively large mass of the concentrate being spray dried. That an unusually high incidence of contact between seed nuclei and the concentrated product being dried is possible is supported at least in part by the fact that crystalline seed material such as lactose possesses greater density than the concentrate seeded. Hence, under the influence of the forces developed in the seeded mass at the time of atomization, the seed crystals may be caused to travel through the mass in such fashion as to contact relatively completely each portion thereof. Certainly the centrifugal forces developed in the rotary type atomizer are sufficient to bring about this migratory action of the seed crystals and although the centrifugal forces developed in the conventional spray nozzle are doubtless of a lesser magnitude it is conceivable that they may be of considerable importance to the end result.

In the practice of the present invention, it is contemplated that a wide variety of seed materials may be used. For example, in those systems in which adulteration is not a consideration, crystallization of the crystallizable substance may be induced by foreign or inert materials as well as by crystalline forms of the substance to be crystallized. In the case of foodstuffs such as milk and milk products, it is usually preferable to employ as seed a crystalline form of the substance to be crystallized in order that adulteration be avoided.

With further reference to the crystallization of lactose of milk and milk products during the process of spray drying, a variety of different forms of seed material such as powered crystalline lactose, powdered crystalline beta-lactose, powdered crystalline alpha-lactose hydrate, powdered crystalline alpha-lactose anhydride, powdered milk products containing crystalline lactose material and slurries of any one or a combination of these may be successfully employed.

The following examples of typical methods of carrying out the present invention are presented for purposes of illustration of the method and not by way of limitation.

*Example 1*

Fluid whole milk was concentrated to provide 5,000 pounds of concentrate testing 46 percent total solids. This material was spray dried using a rotary atomizer and spray drying equipment similar to that shown in Figure 2. The drying operation was carried out by preheating the concentrate to a temperature of 120° F. as it was fed to the drier at a rate of 5,000 pounds per hour while simultaneously feeding powdered crystalline alpha-lactose into the rotary atomizer at a rate of 12.5 pounds per hour. The powdered crystalline alpha-lactose was combined with the concentrated milk product within the rotary atomizer 17 by means of apparatus similar to that illustrated in Figures 4 and 5 in which the milk concentrate was fed into the atomizer 17 by means of concentrate feeders 18 while the seed lactose was introduced into the atomizer from the supply vessel 19 through feeders 20. The resulting mixture was immediately sprayed from the periphery of the rotary atomizer 17 and dried to a moisture content of 12 percent after which the powdered material passed into the collecting cyclone 27, as shown in Figure 2, and was discharged therefrom into the screw conveyor 29 from which it was passed into the final drying unit 30 prior to screening at 31 and packaging at 32. The resulting product had a moisture content of 2 percent and the lactose content was found to be substantially in the crystalline form.

*Example 2*

3,000 gallons of fluid skim milk was evaporated in the conventional manner to a total solids content of 44 percent. The resulting 5,300 pounds of concentrated skim milk was dried using a pressure spray, box-type drier similar in principle and function to the spray drying system illustrated in Figure 1 to which reference is made in the following description.

The concentrated skim milk was heated to a temperature of 125° F. and fed to the drier 2 at a rate of 4,100 pounds per hour by means of high pressure feed pump 3. Immediately prior to entering the atomizing nozzle 1 the concentrate was mixed with a previously prepared seed slurry held in surge tank 5 and fed into the product feed line 4 through slurry feed line 7 and mixing T 8 by means of high pressure pump 6 at a rate of 20 gallons per hour.

In this instance, the seed slurry was prepared by adding 325 mesh alpha-lactose hydrate crystalline seed material, at a rate of 1 pound of seed material per gallon of concentrate, to 32 percent total solids skim milk concentrate tempered to 50° F.

The drier was operated at an inlet air temperature of 320° F. and an outlet air temperature of 132° F. which conditions served to reduce the moisture content of the spray dried product to 15 percent as it was discharged from the desiccator 2. The product was then moved by means of the drag mechanism 12 into the secondary drier 13 where the moisture content was lowered to 3.5 percent before screening at 14 and packaging at 15.

*Example 3*

Fluid skim milk was concentrated to provide 5,000 pounds of skim milk concentrate testing 44 percent total solids. This concentrate was seeded and spray dried under substantially identical conditions to those described in Example 1 with the exception that crystalline alpha-lactose anhydride was used as the seeding material and supplied to the centrifugal atomizer at a rate of 5.2 pounds per hour.

*Example 4*

Fluid skim was concentrated in the conventional manner to a total solids content of 45 percent. 4,800 pounds of this concentrate was spray dried under conditions substantially identical to those employed in Example 1 with the exception that the seed material was skim milk powder, the lactose content of which had been previously crystallized. In this instance the skim milk powder bearing crystalline lactose was added to the concentrate to be dried within the centrifugal atomizer at a rate of 60 pounds per hour.

The product of all of these examples comprised a free flowing non-caking powder having the desirable characteristics of hydrate powder. In general, in carrying out our processes on the order of approximately 50 percent of the lactose is present in the product in crystalline form, although due to variations in the materials used and in details of the apparatus used this percentage may vary over a rather broad range of from 30 percent to 80 percent of the lactose in the crystalline alpha-lactose hydrate form.

What we claim is:

1. A process for producing crystalline spray dried material by a procedure which employs the step of adding seed material to fluid material containing at least one crystallizable substance which is to be rendered crystalline during the process of spray drying, which comprises concentrating said fluid material, thereafter simultaneously introducing said concentrated fluid material and said seed material into an atomizer, atomizing the seeded concentrated fluid material into a drying atmosphere, drying in said atmosphere the resulting atomized particles of said material to a state of at least saturation with respect to said crystallizable substance to be rendered crystalline, and thereafter further drying said spray dried material to a moisture content productive of the desired keeping quality of the final dehydrated product.

2. A process for producing spray dried milk product which has a substantial portion of its lactose in crystalline form which comprises concentrating fluid milk product, thereafter simultaneously introducing said concentrated milk product and seed lactose into an atomizer, atomizing said seeded milk product into a drying atmosphere, drying in said atmosphere the resulting atomized particles of said milk product to a state of at least saturation with respect to said lactose, and thereafter further drying said spray dried milk product to a moisture content productive of the desired keeping quality of the final dehydrated milk product.

3. The method of claim 1 in which the seed material is in a finely divided dry from.

4. The method of claim 1 in which the seed material is added to the concentrated fluid material in the form of a slurry.

5. The method of claim 1 in which the fluid material is concentrated prior to spray drying to a degree below a condition of saturation with respect to the crystallizable substance to be crystallized.

6. The method of claim 1 in which the fluid material is concentrated prior to spray drying to the degree of at least saturation with respect to the crystallizable substance to be crystallized.

7. The method of claim 2 in which the concentrated milk is concentrated to a degree below a condition of saturation with respect to the lactose content of said concentrated milk product.

8. The method of claim 2 in which the concentrated milk product is concentrated to a degree substantially above that at which saturation occurs with respect to the lactose content thereof.

9. The method of claim 2 in which the concentrated milk product is whole milk concentrate.

10. The method of claim 2 in which the concentrated milk product is skim milk concentrate.

11. The method of claim 2 in which the concentrated milk product is whey concentrate.

12. The method of claim 2 in which crystalline lactose seed material in a substantially dry from is added to the concentrated milk product.

13. The method of claim 2 in which the crystalline lactose seed material in the form of a slurry is added to the concentrated milk product.

14. The method of claim 2 in which the spray drying process is accomplished using a pressure spray type atomizer.

15. The method of claim 2 in which the spray drying process is accomplished using a centrifugal type atomizer.

16. The method of claim 2 in which the seed material is a milk product in powder form containing lactose crystals.

17. The method of claim 2 in which the seed material is a milk product containing lactose crystals.

References Cited in the file of this patent

UNITED STATES PATENTS

| | | |
|---|---|---|
| 891,366 | Hatmaker | June 23, 1908 |
| 2,088,606 | Peebles et al. | Aug. 3, 1937 |
| 2,728,678 | Sharp | Dec. 27, 1955 |

UNITED STATES PATENT OFFICE
CERTIFICATION OF CORRECTION

Patent No. 2,970,057  January 31, 1961

John P. Terrett et al.

It is hereby certified that error appears in the above numbered patent requiring correction and that the said Letters Patent should read as corrected below.

Column 6, line 10, for "ued" read -- used --; same column 6, line 63, and column 7, line 16, for "from", each occurrence, read -- form --; column 8, line 16, list of references cited, for "891,366" read -- 891,336 --.

Signed and sealed this 13th day of June 1961.

(SEAL)
Attest:

ERNEST W. SWIDER
Attesting Officer

DAVID L. LADD
Commissioner of Patents